United States Patent
Kim et al.

(10) Patent No.: US 12,321,877 B2
(45) Date of Patent: Jun. 3, 2025

(54) SOLUTION PROVISION METHOD AND SYSTEM FOR SMART FACTORY

(71) Applicants: Korea Advanced Institute of Science and Technology, Daejeon (KR); Aim System, Inc., Gyeonggi-do (KR)

(72) Inventors: Heung Nam Kim, Daejeon (KR); Jae Hoon Kim, Daejeon (KR); Il Jung Kim, Daejeon (KR); Hee Su Chae, Daejeon (KR); Man Ki Kim, Gyeonggi-do (KR); Sung Joon Byun, Gyeonggi-do (KR); Byoung Hoon Jang, Gyeonggi-do (KR)

(73) Assignees: Korea Advanced Institute of Science and Technology, Daejeon (KR); Aim System, Inc., Gyeonggi-do (KR)

( * ) Notice: Subject to any disclaimer, the term of this patent is extended or adjusted under 35 U.S.C. 154(b) by 229 days.

(21) Appl. No.: 17/801,168

(22) PCT Filed: Jun. 5, 2020

(86) PCT No.: PCT/KR2020/007326
§ 371 (c)(1),
(2) Date: Aug. 19, 2022

(87) PCT Pub. No.: WO2021/167173
PCT Pub. Date: Aug. 26, 2021

(65) Prior Publication Data
US 2023/0096947 A1    Mar. 30, 2023

(30) Foreign Application Priority Data
Feb. 19, 2020 (KR) .................. 10-2020-0020374
Apr. 29, 2020 (KR) .................. 10-2020-0052502

(51) Int. Cl.
*G06Q 10/00* (2023.01)
*G06Q 10/0637* (2023.01)

(52) U.S. Cl.
CPC .................. *G06Q 10/0637* (2013.01)

(58) Field of Classification Search
None
See application file for complete search history.

(56) References Cited

U.S. PATENT DOCUMENTS

| 8,706,660 B2 * | 4/2014 | Bart | G06F 16/93 |
| | | | 706/13 |
| 2004/0090864 A1 * | 5/2004 | Larosa | G01S 3/802 |
| | | | 367/124 |

(Continued)

FOREIGN PATENT DOCUMENTS

| JP | 2008256638 A | 10/2008 |
| JP | 2020004372 A | 1/2020 |

(Continued)

OTHER PUBLICATIONS

A Azevedo, A Almeida et al. (Factory templates for digital factories framework)—Robotics and Computer-Integrated Manufacturing, 2011—Elsevier. (Year: 2011).*

(Continued)

*Primary Examiner* — Hafiz A Kassim
(74) *Attorney, Agent, or Firm* — Osha Bergman Watanabe & Burton LLP

(57) ABSTRACT

According to an embodiment, in a solution provision method and system: a target solution for a target factory is determined in a platform in which solutions for a smart factory, the solutions including at least one template, are registered; at least one target template corresponding to the target solution is revised according to an environment of the (Continued)

target factory; and the target solution, to which the revised target template is applied, is applied to the target factory.

13 Claims, 9 Drawing Sheets

(56) References Cited

U.S. PATENT DOCUMENTS

| | | | | |
|---|---|---|---|---|
| 2005/0080609 | A1* | 4/2005 | Bhaskaran | G06Q 10/06 703/22 |
| 2005/0278694 | A1* | 12/2005 | Butler | G06F 8/61 717/107 |
| 2006/0015341 | A1* | 1/2006 | Baker | G10L 15/08 704/255 |
| 2006/0136490 | A1* | 6/2006 | Aggarwal | G06Q 10/06 |
| 2006/0230314 | A1* | 10/2006 | Sanjar | G06F 8/61 714/26 |
| 2007/0208677 | A1* | 9/2007 | Goldberg | G06N 3/126 706/13 |
| 2009/0138315 | A1* | 5/2009 | Schroeder | G06Q 10/06395 705/7.23 |
| 2012/0323624 | A1* | 12/2012 | Bernardini | G06Q 10/0639 705/7.11 |
| 2013/0007527 | A1* | 1/2013 | Petukhov | G06F 11/0793 714/E11.029 |
| 2014/0052773 | A1* | 2/2014 | Deng | H04L 41/145 709/203 |
| 2017/0006135 | A1* | 1/2017 | Siebel | H04L 67/53 |
| 2020/0118186 | A1* | 4/2020 | Sreedhar | G06Q 30/0611 |
| 2021/0124576 | A1* | 4/2021 | Gungabeesoon | G06F 8/38 |

FOREIGN PATENT DOCUMENTS

| | | |
|---|---|---|
| KR | 101190330 B1 | 10/2012 |
| KR | 20130124208 A | 11/2013 |
| KR | 101900026 B1 | 9/2018 |
| KR | 101935652 B1 | 1/2019 |
| KR | 20200006939 A | 1/2020 |
| KR | 102063131 B1 | 2/2020 |

OTHER PUBLICATIONS

Lee J (2015) Smart factory systems. Informatik Spektrum 38(3):230-235. (Year: 2015).*

International Search Report issued in corresponding International Application No. PCT/KR2020/007326 mailed Nov. 13, 2020 (6 pages).

Written Opinion issued in corresponding International Application No. PCT/KR2020/007326 mailed Nov. 13, 2020 (6 pages).

* cited by examiner

FIG. 4

AKA-Develop framework 400

AKA-Develop Application Component:

| Visualization Repository | Template Repository | Training Repository |
|---|---|---|

| Smart Factory for Industry (Specific) | Mater Management | System Management | |
| | Process Management | Performance Monitor | Real-time Monitor |
| Smart Factory Core (Generic) | Manufacture Management | Deplay Management | |
| | Log Management | Version Control | |
| | Configuration Management | | |

AKA-Develop Base Component:

| IF Action | Schedula Action | | DB Template |
|---|---|---|---|
| Action Manager | User Management | | |
| | Policy Management | | In-Memory |
| WF Engine | Rule Engine | Object Management | |

AKA-Develop System Framework:

| UI Manager | Adaptor | Spring Boot | Eclipse Plug-in | Data Accesor |
|---|---|---|---|---|
| | Messaging | JVM1.X | | JDBC |

SOLUTION PROVISION METHOD AND SYSTEM FOR SMART FACTORY

TECHNICAL FIELD

Example embodiments relate to a solution provision method and system for a smart factory.

BACKGROUND ART

A solution market for smart factories is experiencing difficulties in distribution and dissemination due to various issues potentially arising between consumer companies and provider companies. For example, a consumer company may have difficulty in adopting a solution suitable for the consumer company due to distrust of unverified solutions of provider companies and the lack of a method of comparing and analyzing solutions. In contrast, a provider company may experience an increasing cost for constructing solutions due to an increased operating cost for individually finding consumer companies.

The above description is information the inventor(s) acquired during the course of conceiving the present disclosure, or already possessed at the time, and is not necessarily art publicly known before the present application was filed.

DISCLOSURE OF INVENTION

Technical Solutions

According to an embodiment, developing, modifying, and updating a solution by a template that is based on an industry-specific reference model for each industry among various industries may activate the transaction and/or distribution of the solution.

According to an embodiment, selecting, modifying, and updating a solution registered on a platform for each module and/or solution package may enable a quick provision of a solution suitable for a user's environment.

According to an embodiment, verifying a solution based on an industry-specific reference model and registering the verified solution on a platform may improve the reliability of the solution.

According to an embodiment, comparing and analyzing solutions registered on a platform and selecting a solution for each module and/or solution package may enable a provision of a solution suitable for a target factory.

According to an embodiment, modifying and/or supplementing a solution for each module and/or package and applying it to an actual site may improve the suitability of the solution for the site.

According to an aspect, there is provided a solution provision method including: determining a target solution for a target factory from a platform on which solutions including at least one template for a smart factory are registered; modifying at least one target template corresponding to the target solution according to an environment of the target factory; and applying, to the target factory, a target solution to which the modified target template is applied.

The template may include information and functions based on an industry-specific reference model.

The determining the target solution may include providing a user interface (UI) for searching and selecting a solution corresponding to the target factory from among the registered solutions; and setting, as the target solution, the solution selected through the UI.

The providing the UI may include providing the UI for searching and selecting the target solution corresponding to the target factory for each entire package or for each module included in the package.

The solution provision method may further include providing a description of at least one essential module required for executing the target solution selected through the UI.

When the target solution is selected, the modifying the target template may include extracting an additional template corresponding to the essential module along with a template corresponding to at least one module included in the target solution; and modifying the target template by repackaging the extracted template and the additional template.

The target template may correspond to a function of at least one module among a plurality of modules for the target solution.

The modifying the target template may include modifying the target template for each entire package or for each module.

The modifying the target template may include modifying the target template according to the environment of the target factory by a library that is provided through the platform and developed to enable modification of parameters.

The solution provision method may further include verifying the solution based on the industry-specific reference model; and registering the verified solution on the platform.

The solution provision method may further include extracting the target solution applied to the target factory; and updating the platform by the extracted target solution.

The solution provision method may further include providing a library for at least one template including requirements according to solution characteristics of the smart factory.

According to another aspect, there is provided a solution provision system including: a processor configured to determine a target solution for a target factory from a platform on which solutions including at least one template for a smart factory are registered, modify at least one target template of the target solution according to an environment of the target factory, and apply, to the target factory, a target solution to which the modified target template is applied.

The solution provision system may further include a UI for searching and selecting a solution corresponding to the target factory from among the registered solutions, and the processor may set the solution selected through the UI as the target solution.

The UI may search and select the target solution corresponding to the target factory for each entire package or for each module included in the package, and the processor may provide a description of at least one essential module required for executing the target solution selected through the UI.

When the target solution is determined through the UI, the processor may modify the target template by extracting an additional template corresponding to the essential module along with a template corresponding to at least one module included in the target solution and repackaging the extracted template and the additional template.

The target template may correspond to a function of at least one module among a plurality of modules for the target solution.

The processor may modify the target template for each entire package or for each module.

The processor may modify the target template according to the environment of the target factory by a library that is provided through the platform and developed to enable modification of parameters.

According to aspects described above, developing, modifying, and updating a solution by a template that is based on an industry-specific reference model for each industry among various industries may activate the transaction and/or distribution of the solution.

According to aspects described above, selecting, modifying, and updating a solution registered on a platform for each module and/or solution package may enable a quick provision of a solution suitable for a user's environment.

According to aspects described above, verifying a solution based on an industry-specific reference model and registering the verified solution on a platform may improve the reliability of the solution.

According to aspects described above, comparing and analyzing solutions registered on a platform and selecting a solution for each module and/or solution package may enable a provision of a solution suitable for a target factory.

According to aspects described above, modifying and/or supplementing a solution for each module and/or package and applying it to an actual site may improve the suitability of the solution for the site.

BRIEF DESCRIPTION OF DRAWINGS

FIG. 4 is a diagram illustrating an example of a framework for developing a solution according to an embodiment.

BEST MODE FOR CARRYING OUT INVENTION

Figure 1:
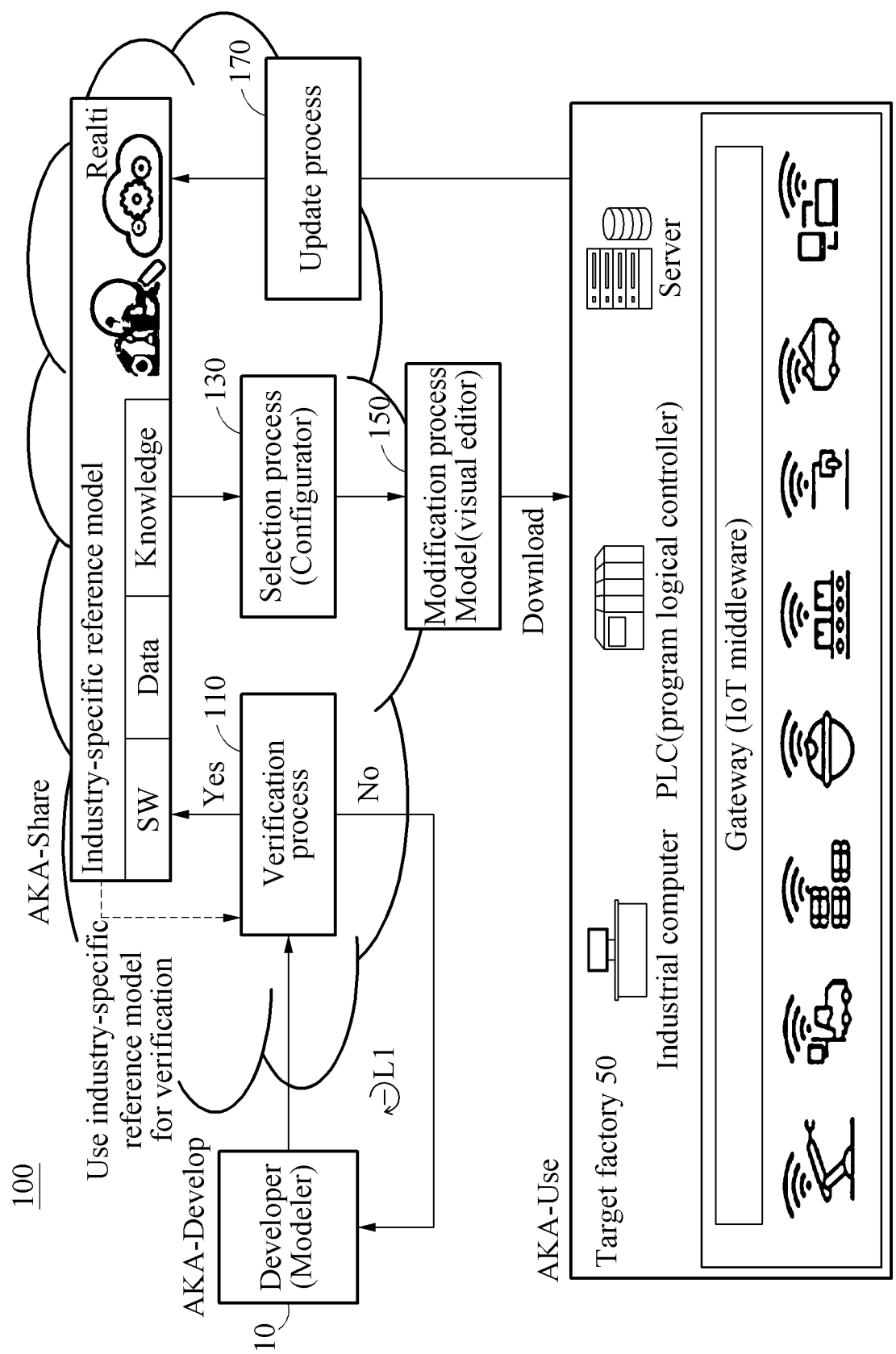
FIG. 1 is a diagram illustrating an example of a configuration of a solution provision system for a smart factory according to an embodiment.

Hereinafter, some examples will be described in detail with reference to the accompanying drawings. However, various alterations and modifications may be made to the examples. Here, the examples are not construed as limited to the disclosure and should be understood to include all changes, equivalents, and replacements within the idea and the technical scope of the disclosure.

The terminology used herein is for the purpose of describing particular examples only and is not to be limiting of the examples. As used herein, the singular forms "a," "an," and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in the examples described herein may also be referred to as a second member, component, region, layer, or section without departing from the teachings of the examples.

Throughout the specification, when a component is described as being "connected to" or "coupled to" another component, it may be directly "connected to" or "coupled to" the other component, or there may be one or more other components intervening therebetween. In contrast, when an element is described as being "directly connected to" or "directly coupled to" another element, there can be no other elements intervening therebetween.

Unless otherwise defined, all terms, including technical and scientific terms, used herein have the same meaning as commonly understood by one of ordinary skill in the art to which this disclosure pertains based on an understanding of the present disclosure. Terms, such as those defined in commonly used dictionaries, are to be interpreted as having a meaning that is consistent with their meaning in the context of the relevant art and the present disclosure, and are not to be interpreted in an idealized or overly formal sense unless expressly so defined herein.

Hereinafter, example embodiments will be described in detail with reference to the accompanying drawings, and like reference numerals in the drawings refer to like elements throughout.

FIG. 1 is a diagram illustrating an example of a configuration of a solution provision system for a smart factory according to an embodiment. Referring to FIG. 1, a solution provision system 100 may perform a verification process 110, a selection process 130, a modification process 150, and an update process 170, but examples are not limited thereto. A method of operating the solution provision system 100 for performing the verification process 110, the selection process 130, the modification process 150, and the update process 170 will be described in detail with reference to FIG. 2 below.

The verification process 110 may be a process performed to increase the reliability of a solution. In general, solution verification may be performed only by technical verification. Unlike this, the verification process 110 may employ technical solution verification through, for example, a static analysis and/or dynamic analysis, to increase the reliability of software (SW), and also employ process verification based on an industry-specific reference model to improve the applicability of a solution for a smart factory.

The solution provision system 100 may verify a solution registered on a platform, such as, for example, a solution store, through the verification process 110.

The solution store may correspond to an AKA-Share frame illustrated in FIG. 1, for example. The AKA-Share frame, which is a space for searching and/or sharing solutions, may be a frame for sharing solutions such that a developer (or a provider or modeler) 10 or a third party uses modules or functions created by the developer 10 through an AKA-Develop framework. The AKA-Develop framework will be described in detail with reference to FIG. 4 below.

The AKA-Share frame may be divided into, for example, a public AKA-Share area and a private AKA-Share area according to a content characteristic of a shared solution. The public AKA-Share area and the private AKA-Share area will be described in detail below.

In the verification process 110, the solution provision system 100 may verify a solution to be registered on a platform based on, for example, an industry-specific reference model for each industry of various industries. A method of performing the verification process 110 by the solution provision system 100 will be described in detail with reference to FIG. 3 below.

The selection process 130 may be a process of selecting a solution for a target factory 50 or a solution corresponding to the target factory 50 from among the solutions registered on the platform. Hereinafter, for convenience of description, a solution for the target factory 50 or a solution corresponding to the target factory 50 will be referred to as a "target solution." A structure of the platform will be described in detail with reference to FIG. 5 below.

The solution provision system 100 may select a target solution from among the solutions registered on the platform for each solution package or for each module of a solution. For example, the solution provision system 100 or a user may select or determine a target solution suitable for the environment of the target factory 50 by comparing and/or analyzing the solutions registered on the platform (e.g., the solution store). The term "target factory" (e.g., the target factory 50) may be a factory of a consumer company that is a target to which a solution for a smart factory is to be applied.

The selection process 130 may provide a selection function for each entire package or module of a solution for a smart factory by, for example, recommending a solution for each industry and/or function. The user may thereby reduce costs by selecting a solution (or the target solution) suitable for the target factory 50 on an actual site from among the solutions registered on the platform. The target factory 50 on the site may include, for example, various Internet of things (IoT) middleware including a gateway in addition to an industrial computer, a program logical controller (PLC), and a server, but examples of which are not necessarily limited thereto.

The selection process 130 may be performed, for example, by a configurator that allows the user to select an option and displays a change in product or process result.

The modification process 150 may be a process of modifying an entire package or some modules of the solution selected from the solution store to be applied to the target factory 50 on the actual site. The solution provision system 100 may modify the solution (e.g., the entire package or module(s)) selected in the selection process 130 for each function, module, or package such that the solution is to be applied to the target factory 50 on the site, through the modification process 150.

The solution provision system 100 may provide a solution suitable for a consumer (e.g., the target factory 50) by using a parameterizing technique in a development tool environment provided by the solution store, for example.

For example, the solution provision system 100 may apply the solution to the target factory 50 by modifying at least one target template corresponding to the target solution according to an environment of the target factory 50. The term "target template" is only referred to as it is in that it corresponds to a target solution and may have the same form as a template.

According to an embodiment, a template may be used to modify a solution to a target solution. The template will be described in detail with reference to FIG. 6 below. In addition, an example of a scenario of developing a solution for a smart factory by the solution provision system 100 using a template will be described in detail with reference to FIG. 7 below.

The update process 170 may be a process of repackaging a solution (a solution modified for the target factory 50) constructed in the target factory 50 on the site and storing it in the solution store. The solution provision system 100 may accumulate and store the module and/or solution package modified through the modification process 150 in the solution store such that a third user may readily reuse it. Solutions accumulated in the solution store may be reused in the same industry and field. An operation of providing accumulated solutions for a smart factory will be described in detail with reference to FIG. 8 below.

Figure 2:
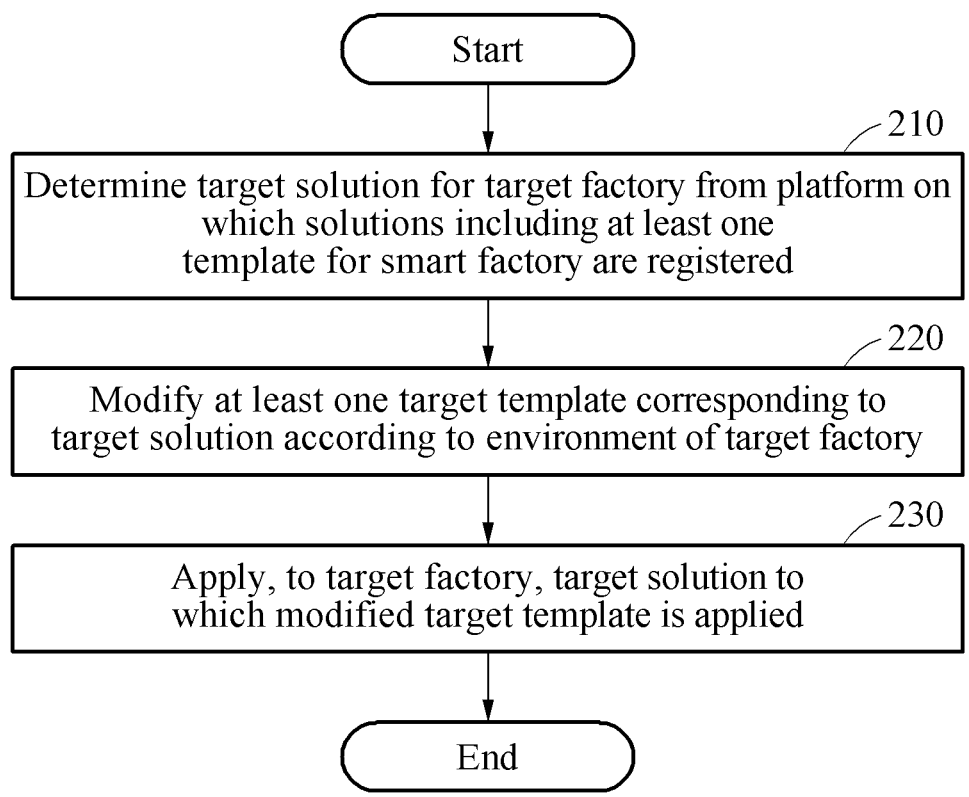
FIG. 2 is a flowchart illustrating an example of a solution provision method for a smart factory according to an embodiment.

FIG. 2 is a flowchart illustrating an example of a solution provision method for a smart factory according to an embodiment. Referring to FIG. 2, in operation 210, a solution provision system according to an embodiment may determine a target solution for a target factory from a platform on which solutions including at least one template for a smart factory are registered. At least one template included in a solution may include, for example, information and functions based on an industry-specific reference model. The solutions registered on the platform may be verified based on the industry-specific reference model. The solutions registered on the platform may be verified through a process to be described hereinafter with reference to FIG. 3.

In operation 210, the solution provision system may provide a user interface (UI) for searching and selecting a solution corresponding to the target factory from among the solutions registered on the platform. For example, the solution provision system may provide the UI for searching and selecting the target solution corresponding to the target factory for each entire solution package or for each module included in a solution package. In this case, when an operation of an essential module is required, before and after, executing the target solution selected through the UI, the solution provision system may provide a description of at least one required essential module. The solution provision system may set, as the target solution, the solution selected through the UI.

In operation 220, the solution provision system may modify at least one target template corresponding to the target solution according to an environment of the target factory. For example, the target template may correspond to a function of at least one module among a plurality of modules for the target solution.

For example, under the assumption that any one target solution is selected through the UI in operation 210, the solution provision system may extract, from the platform, an additional template corresponding to the essential module along with a template corresponding to the at least one module included in the target solution in operation 220. The solution provision system may modify the target template by reconfiguring (or repackaging) the extracted template and the additional template.

The solution provision system may provide a suitable solution to a consumer by using a parameterizing technique in a development tool environment provided by a solution store. The solution provision system may modify the target template for each entire package or for each web-based application module. The solution provision system may modify the target template according to the environment of the target factory by a library that is provided through the platform and developed to enable the modification of parameters. According to embodiments, the modification of the target template may be performed automatically by the solution provision system or manually by the user on the actual site.

In operation 230, the solution provision system may apply, to the target factory, a target solution to which the target template modified in operation 220 is applied. The solution provision system may extract the target solution applied to the target factory in operation 230 and update the platform by the extracted target solution.

According to an embodiment, before performing operation 210, the solution provision system may provide a library for at least one template including requirements according to solution characteristics of the smart factory. The term "library for at least one template" used herein may refer to a library that enables the development of requirements from consumers, for example, material management and production management, for each module according to solution characteristics for a smart factory.

Figure 3:
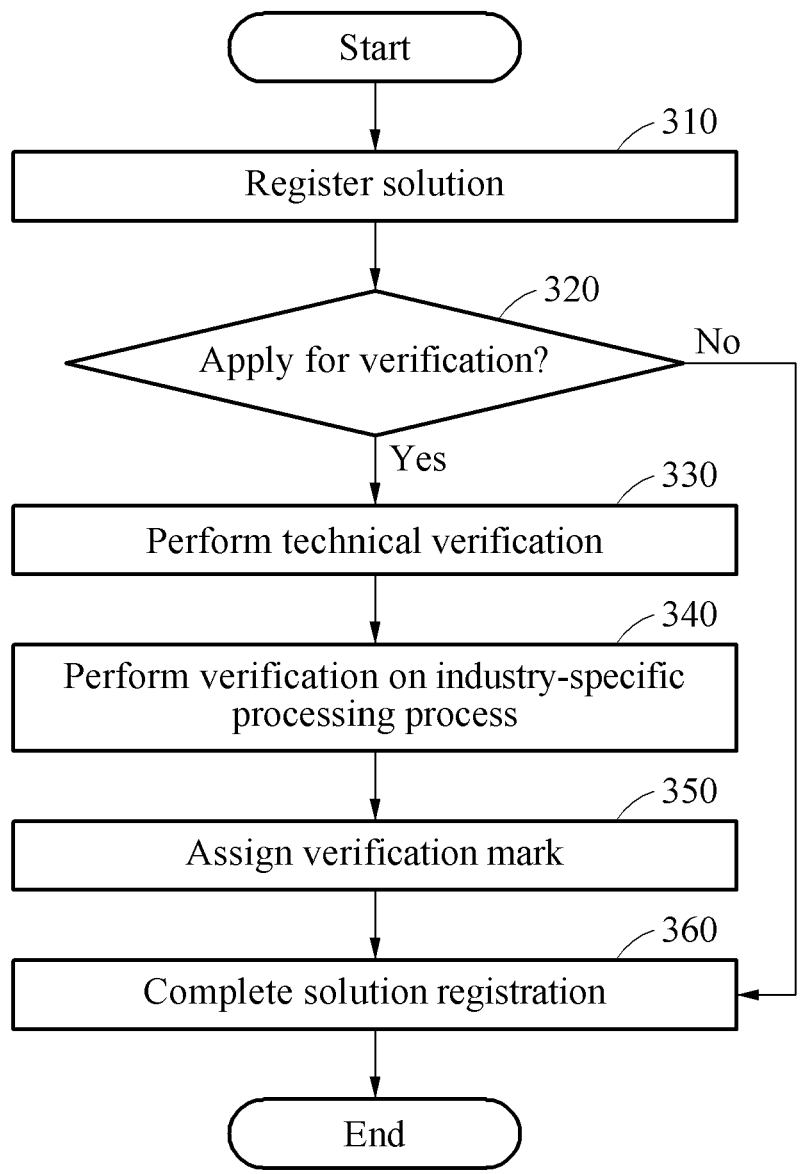
FIG. 3 is a flowchart illustrating an example of verifying a solution according to an embodiment.

FIG. 3 is a flowchart illustrating an example of verifying a solution according to an embodiment. Referring to FIG. 3, in operation 310, a solution provision system according to an embodiment may receive a request for registration of a solution developed by a developer or provider. When the request for the registration is received in operation 310, the solution provision system may provide the developer or provider with a pre-checklist for checking whether verification is performed. The solution developer or provider may fill out the pre-checklist and submit it to the solution provision system.

In operation 320, the solution provision system may determine whether a corresponding solution is a target for which the verification is applied in response to the request for the registration received in operation 310. In this case, whether the solution is such a verification application target may be determined by the pre-checklist submitted by the solution developer or provider. That is, when the solution is described in the pre-checklist, the solution provision system may determine the solution as the verification application target. In operation 360, when the solution is determined not to be the verification application target in operation 320, the solution provision system may complete the solution registration by registering the solution in a solution store or on a platform.

In operation 330, when the solution is determined to be the verification application target in operation 320, the solution provision system may perform technical verification on the solution. To objectively and consistently evaluate quality of the solution, the solution provision system may perform the technical verification based on, for example, international standards (e.g., ISO/IEC 25000 series), in operation 330. In this case, the solution provision system may perform the technical verification using software evaluation items, such as, for example, functional suitability, performance efficiency, compatibility, usability, reliability, security, maintainability, and portability, and/or quality evaluation items to which requirements specific to a solution for a smart factory are applied.

In operation 340, the solution provision system may perform verification on an industry-specific processing process of the solution. For example, the solution provision system may verify whether the solution is suitable for a specific industry in operation 340. The solution provision system may perform the verification on the solution based on, for example, an industry-specific standard process chart and may thereby secure neutrality of the verification. In addition, the solution provision system may perform the verification on the industry-specific processing process of the solution by additionally considering industry-specific characteristics, standard processes, standard functions, major equipment, and requirements.

In operation 350, the solution provision system may assign a verification mark (e.g., ISO/IEC 25000 certification mark) to the solution for which the technical verification in operation 330 and the verification on the industry-specific processing process in operation 340 have been completed.

In operation 360, the solution provision system may complete the solution registration by registering, on the platform or in an industrial app store, the solution to which the verification mark is assigned in operation 350.

FIG. 4 is a diagram illustrating an example of a framework for developing a solution according to an embodiment. Referring to FIG. 4, illustrated is an AKA-Develop framework 400 for developing a solution.

A developer may develop a solution using an AKA-Develop platform library specific to manufacturing under an integrated development environment (IDE), such as, for example, Eclipse and WebStorm. The IDE may be software for constructing an application that combines common developer tools into a single graphical user interface (GUI). The developer may create a solution package or at least one module of the solution package in units of web-based application modules.

The AKA-Develop framework 400 may include, for example, an embedded Tomcat, through which a user may readily develop a solution. The AKA-Develop framework 400 may provide, for example, a library, a function, and a stored procedure (SP) developed to enable the modification of parameters.

Accordingly, at least one module of a solution package may be developed and/or modified by calling, for example, a library, a function, an SP, a database (DB), a message, and/or a memory.

The AKA-Develop framework 400 may perform distributed storage and/or integrated processing that occurs in the process of developing a solution. According to embodiments, the AKA-Develop framework 400 may also be used in the process of modifying a solution.

Figure 5:
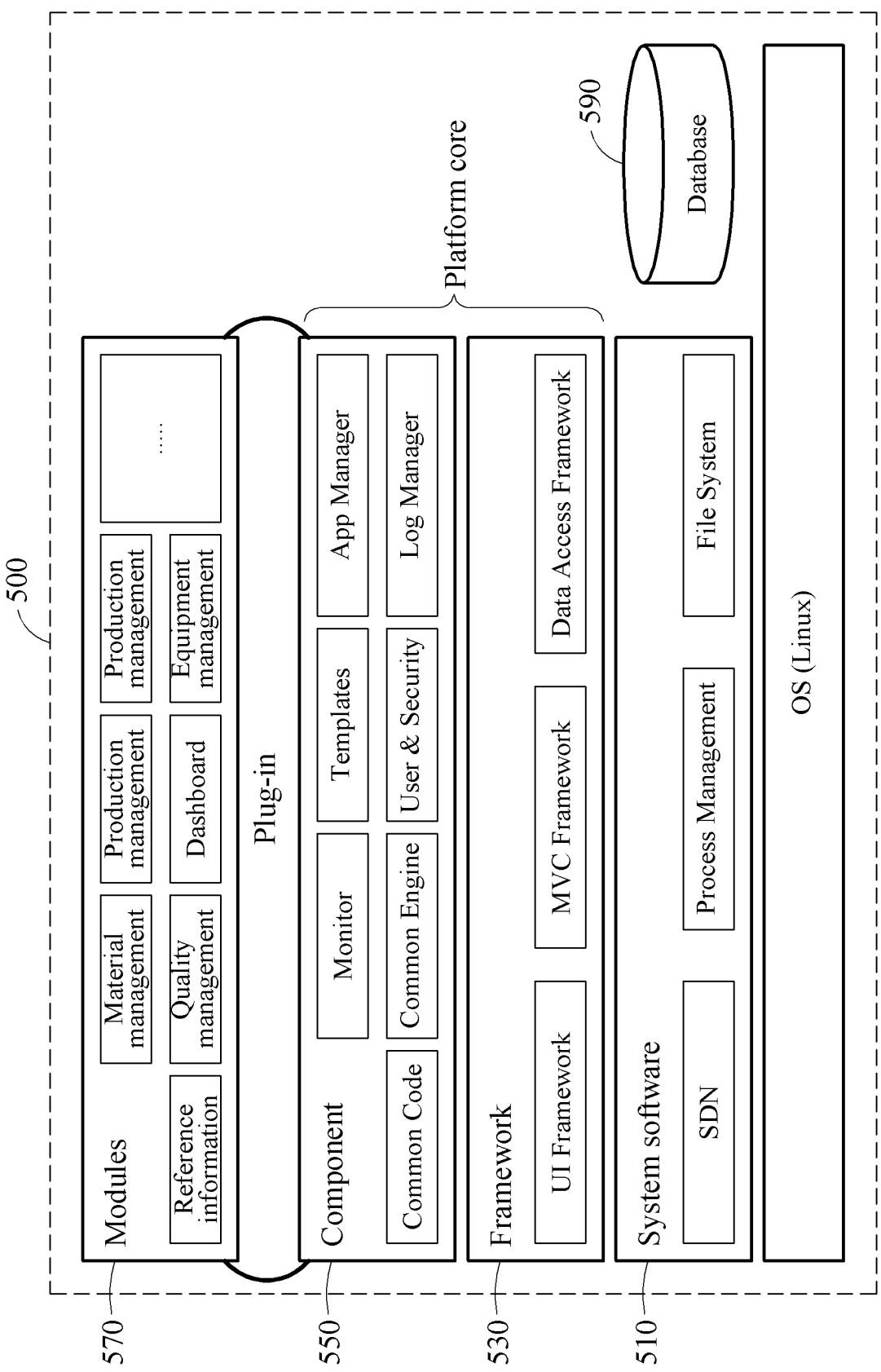
FIG. 5 is a diagram illustrating an example of a structure of a platform according to an embodiment.

FIG. 5 is a diagram illustrating an example of a structure of a platform according to an embodiment. Referring to FIG. 5, a platform 500 according to an embodiment may include at least one of operating system (OS) (e.g., Linux)-based system software 510, a framework 530, a component 550, modules 570, or a DB 590. The framework 530, the component 550, and the modules 570 may correspond to the core of the platform 500. The platform 500 may correspond to an operating platform of a solution provision system according to an embodiment.

The system software 510 may include software-defined networking (SDN), process management, file system, and the like. The SDN may be a network virtualization approach to optimize network resources and rapidly adapt networks to changing business requirements, applications, and traffic. The SDN may be implemented by separating a network control plane and a data plane and generating a software programmable infrastructure that is separate from physical equipment.

The framework 530 may include, for example, a UI framework, a model-view-controller (MVC) framework, and a data access framework.

The component 550 may include, for example, a monitor, templates, an application (app) manager, a common code, a common engine, user & security, a log manager, and the like.

The modules 570 may include modules corresponding to, for example, material management, production management, report, reference information, quality management, dashboard, equipment management, and the like.

The solution provision system may provide, for example, a library that allows consumers to develop necessary matters such as material management and production management for each module according to solution characteristics for a smart factory. The solution provision system may provide a library according to a manufacturing solution environment based on components. The solution provision system may provide a solution development environment for each module through modules additionally created by the developer or provider by utilizing stored modules and libraries provided by default in a platform.

The solution provision system may provide a selection function for each entire package or for each module of a solution for a smart factory by recommending a solution for each industry and function. The user may then select a solution package or module suitable for an actual site from among solutions provided by the solution provision system and may thereby reduce costs.

The solution provision system may provide a search function that allows a consumer to select an entire solution package or each solution module required when using a solution for a smart factory. The search function may be implemented in the form of a GUI, for example.

In addition, the solution provision system may classify searchable categories by each industry and/or application to support a consumer to search for and utilize necessary solutions. The categories by industry may include, for example, common, component assembly, PCB manufacturing, casting, forging, plating, painting, pressing, precision machining, injection, molding, cutting, bending, pharmaceutical, chemical, and textile industries.

In addition, the categories by application may include applications for, for example, production management, material management, quality management, equipment management, report, and equipment automation.

Figure 6:
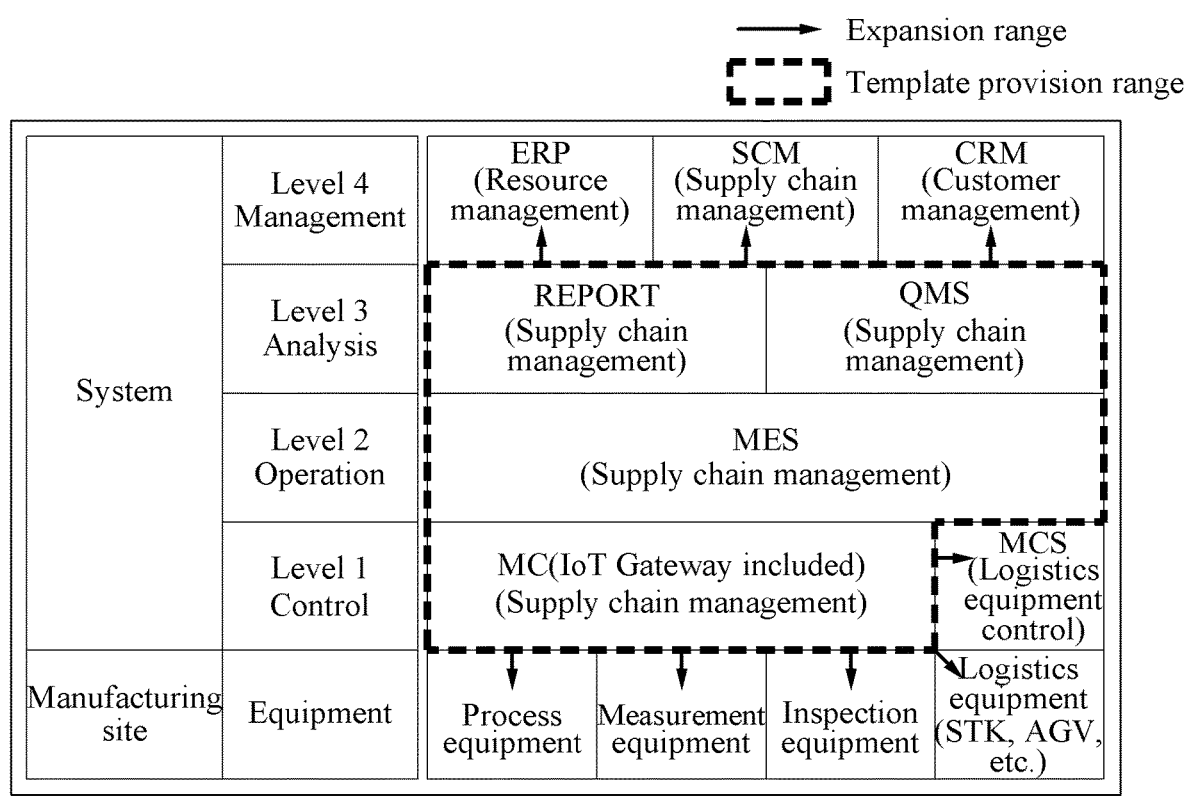
FIG. 6 is a diagram illustrating an example of a template according to an embodiment.

FIG. 6 is a diagram illustrating an example of a template according to an embodiment. Referring to FIG. 6, illustrated is an example template provision range of a solution for a smart factory.

As described above, a solution provision system according to an embodiment may provide a template based on a library specific for manufacturing. A development template may be provided for smooth solution modification in a solution development and modification process, and the convenience of solution development may thereby be improved. In addition, the solution provision system may develop a solution based on a template and may be designed to easily modify it when using it on an actual site. Further, the solution provision system may allow a consumer to select and utilize a function required by the consumer from among all functions of modules provided by a template. In this case, the function required by the consumer (or a receiver) may be selected through a configuration tool, for example.

A range of providing a template, or the template provision range, may vary for each solution of a smart factory. In FIG. 6, a broken line indicates the template provision range, and an arrow indicates an expansion range.

A template according to an embodiment may be provided in a range including, for example, a machine controller (MC) (an IoT gateway included) for first-level control of the system, a manufacturing execution system (MES) for second-level operation of the system, and production/equipment indices (REPORT) and quality analysis and quality management system (QMS) for third-level analysis of the system, as illustrated in FIG. 6. The MES may include, for example, work-in-process, equipment, materials, quality, recipe, work assignment, interlock, and the like.

According to embodiments, the template may be expanded to a range of a material control system (MCS) for first-level control of the system and/or an enterprise resource planning (ERP), supply chain management (SCM), and customer relationship management (CRM) for fourth-level management of the system. In addition, the template may be expanded to an equipment field in a manufacturing site, such as, for example, process equipment, measurement equipment, inspection equipment, and logistics equipment.

The solution provision system may integrate the development, distribution, and operation of a solution by providing a template along with a unified development environment, and enable the development, and maintenance/repair of the solution, thereby allowing various organizations to accumulate and/or share technology and information.

The solution provision system may provide a template based on an industry-specific reference model, register it on a platform, and download the template when applying it on an actual site to implement customization, thereby enabling smooth installation and improving maintainability. The industry-specific reference model may be based on, for example, a work process for each industry, standard functions for each industry, and other data for each industry.

Figure 7:
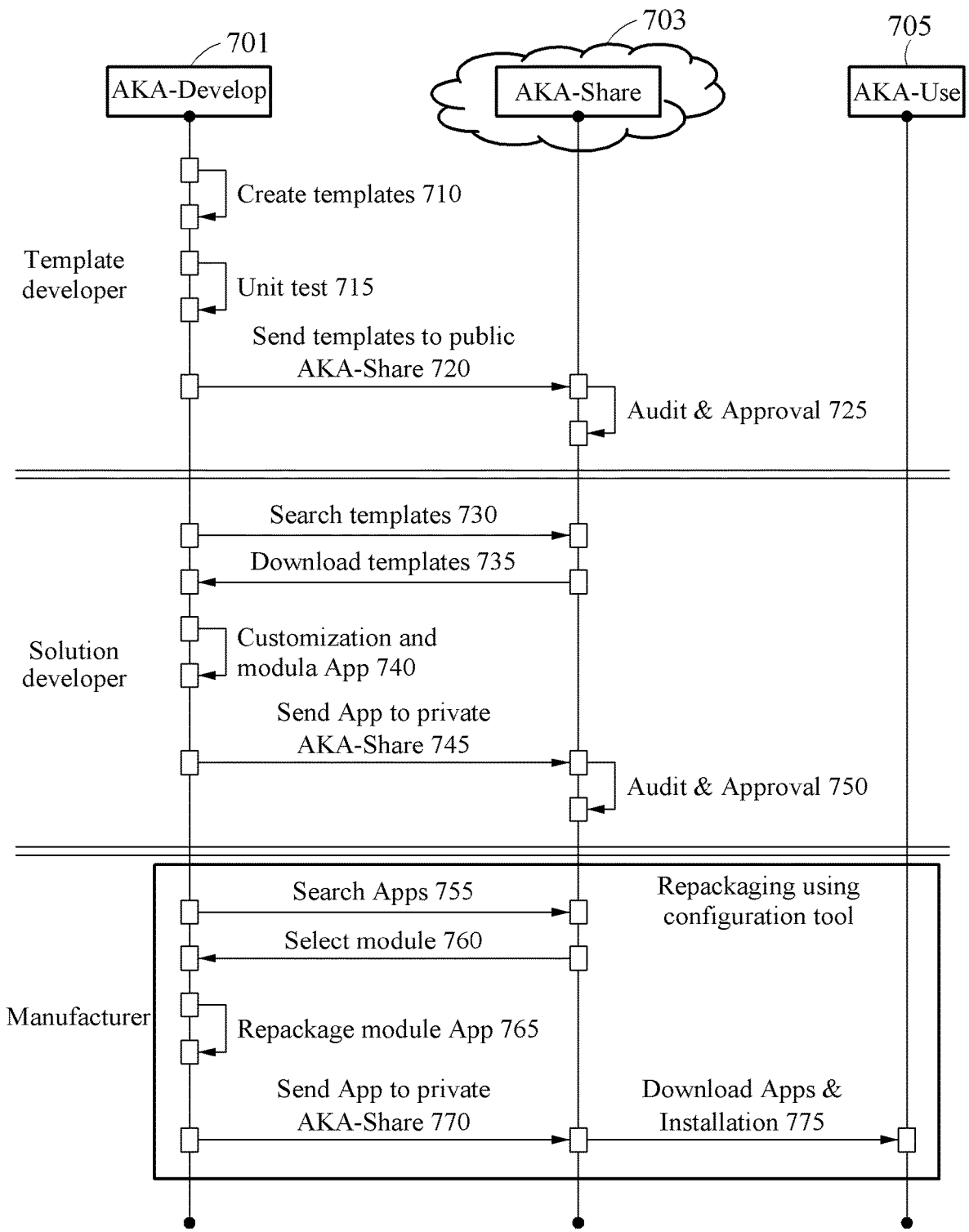
FIG. 7 is a diagram illustrating an example of a scenario for developing a solution for a smart factory by using a template according to an embodiment.

FIG. 7 is a diagram illustrating an example of a scenario for developing a solution for a smart factory by using a template according to an embodiment. Referring to FIG. 7, illustrated are an AKA-Develop platform 701 for a template developer, an AKA-Share platform 703, and an AKA-Use platform 705.

The AKA-Develop platform 701 may be for a template developer.

The AKA-Share platform 703 may correspond to a space for searching and/or sharing solutions. A solution developer or user may share a solution on the AKA-Share platform 703 such that they or a third party may utilize functions or modules they have created. The AKA-Share platform 703 may be divided into a public AKA-Share area, which is a public area, and a private AKA-Share area, which is a private area, according to characteristics of a content stored (or shared) in the space.

The public AKA-Share area may be, for example, an area in which the template developer registers a library, a function, and/or a stored procedure (SP) created through a development environment. The library, function, and the like created in such a way may be registered in the public AKA-Share area such that the solution developer refers to it when developing a solution, and a corresponding version may be managed. The public AKA-Share area may correspond to, for example, a space for adding a function of a platform as a service (PaaS) in the cloud.

In addition, the private AKA-Share area may be the same as the public AKA-Share area but may correspond to a space for a manufacturing company. However, if a user of a manufacturing company who purchases and uses a solution does not use the solution as it is but needs to modify a UI, a document, and the like, the private AKA-Share area may provide a GUI that changes a screen configuration and/or a program layout. The user of the manufacturing company or a matching provider may modify the solution through the private AKA-Share area and re-register it on the platform.

The AKA-Use platform 705 may be for the manufacturing company, that is, a target factory corresponding to a consumer.

For example, a scenario in which the template developer, the solution developer, and the manufacturing company develop a solution for a smart factory may be as follows.

The template developer may create a template using the AKA-Develop platform 701 in step 710, and test the created template in unit or module unit in step 715. The template developer may transmit the tested template to the public AKA-Share area of the AKA-Share platform 703 in step 720. The AKA-Share platform 703 may perform verification (e.g., audit and approval) on the template transmitted from the AKA-Develop platform 701 and register the verified template in the public AKA-Share area in step 725.

The solution developer may search the AKA-Share platform 703 for a required template in step 730 and download the retrieved template in step 735. The solution developer may customize the downloaded template for a target factory through the AKA-Develop platform 701, while creating or reconfiguring (or repackaging) the template in units of web-based app modules in step 740. The solution developer may transmit the created or repackaged template to the private AKA-Share area of the AKA-Share platform 703 in step 745. The AKA-Share platform 703 may perform verification (e.g., audit and approval) on the template transmitted from the solution developer in step 745 and register the verified template in the private AKA-Share area in step 750.

In addition, the user of the manufacturing company may search the AKA-Share platform 703 for a solution or a module of the solution in step 755 and select the retrieved solution or the retrieved module of the solution in step 760. In this case, the solution provision system may provide a GUI environment in which the user of the manufacturing company may search for and select, by module, a solution developed for each solution package and each module. In addition, when the user of the manufacturing company selects a required module, the solution provision system may provide a description and an automatic selection function of an essential module required before and after a process of the module selected by the user. The user of the manufacturing company may extract and repackage the module selected in step 760 along with the essential module required before and after in step 765. In this case, the solution provision system may be configured to enable repackaging of the module in the GUI environment without additional coding. The GUI may allow the user to design a screen and select a required function.

The module repackaged in step 765 may be transmitted to the private AKA-Share area of the AKA-Share platform 703 in step 770. The user of the manufacturing company or the matching provider may modify the solution through the private AKA-Share area and register it again on the AKA-Share platform 703. The AKA-Use platform 705 may download the repackaged module or the modified solution and install it in the target factory in step 775.

The steps 755 to 775 described above may be performed by a configuration tool provided by the solution provision system. The configuration tool may include, for example, a function of searching for and reconfiguring (or repackaging) a module included in a solution package.

Figure 8:
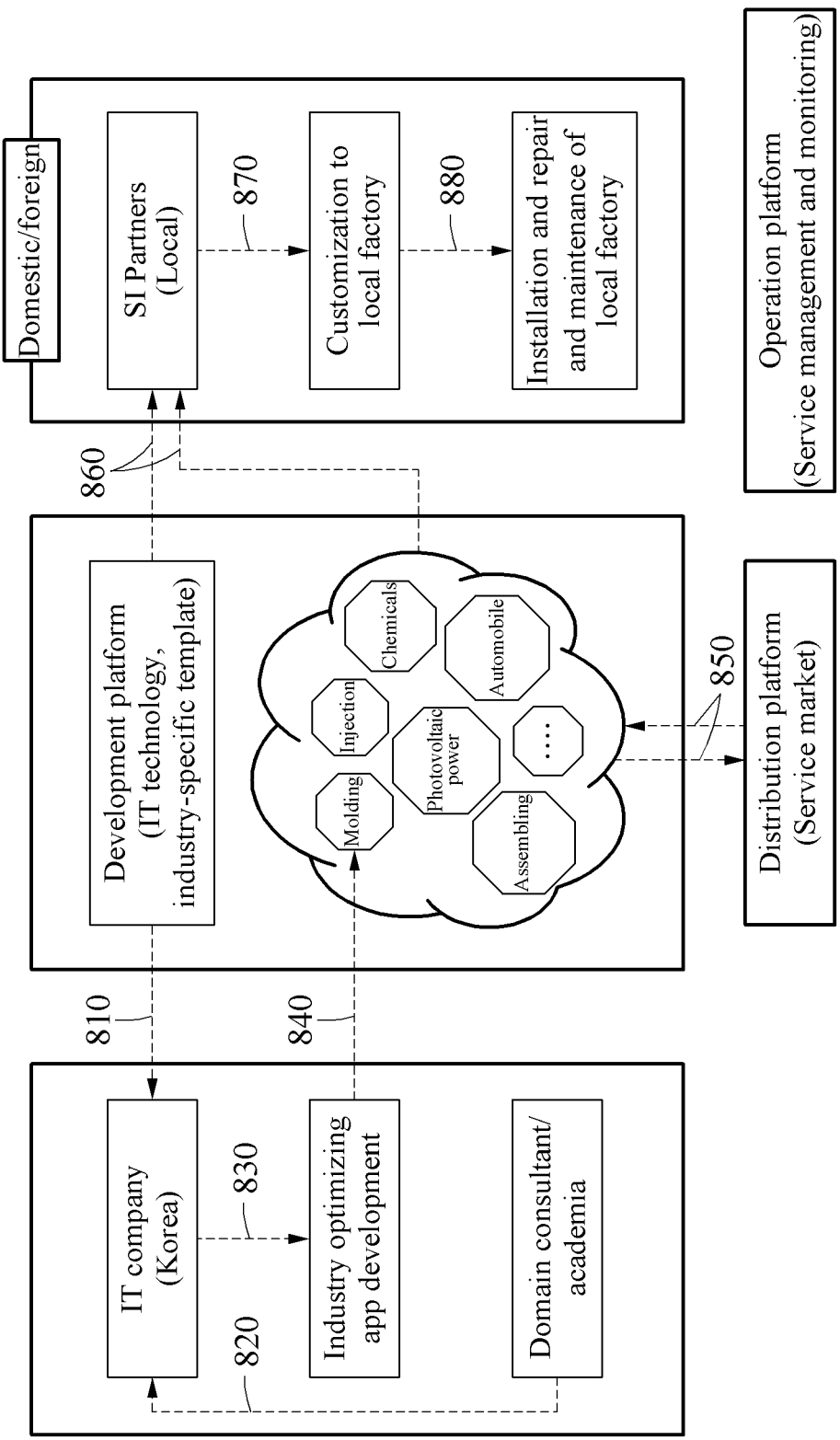
FIG. 8 is a diagram illustrating am example of providing a solution for a smart factory according to an embodiment.

FIG. 8 is a diagram illustrating am example of providing a solution for a smart factory according to an embodiment. Referring to FIG. 8, a solution provision system according to an embodiment may provide a development platform including an industry-specific template of IT technology to an IT company in step 810. The IT company may collect opinions and the like from domestic consultants and/or academia in step 820, and develop an application (e.g., a solution or a module of the solution) optimized for the corresponding industry through the development platform by applying the collected information in step 830.

The IT company may register the application developed in step 830 in a shared space (e.g., an AKA-Share platform) in step 840. The application registered in step 840 may be provided to a service market through, for example, a distribution platform in step 850.

The application registered in step 840 may be provided to system integration (SI) partners along with a newly developed solution through the development platform in step 860. The SI partners may transfer the solution or modules of the solution provided in step 860 to a local factory in step 870. The local factory may customize the received solution or modules to fit them to a local situation, and install it in the local factory and maintain and repair it in step 880. In this case, the local factory may perform service management and monitoring on the solution through, for example, an operating platform provided in advance.

Figure 9:
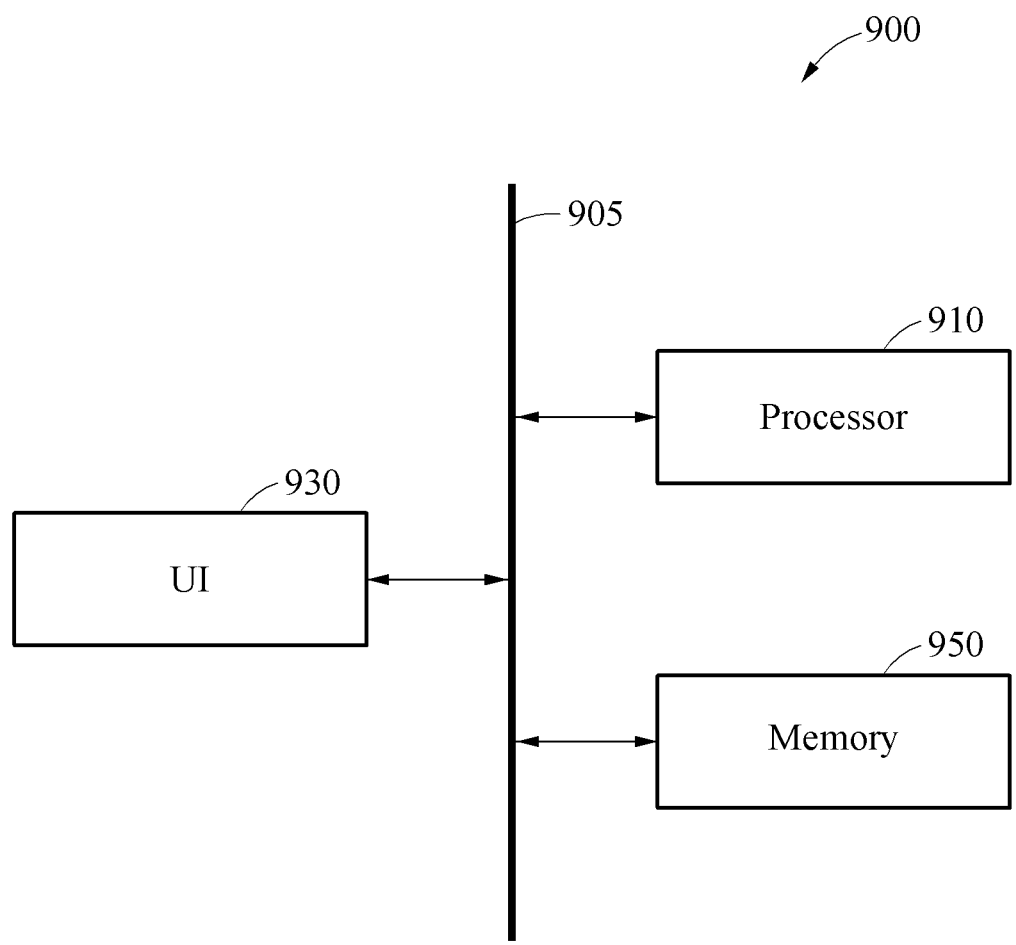
FIG. 9 is a block diagram illustrating an example of a solution provision system for a smart factory according to an embodiment.

FIG. 9 is a block diagram illustrating an example of a solution provision system for a smart factory according to an embodiment. Referring to FIG. 9, a solution provision system 900 according to an embodiment may include a processor 910, a UI 930, and a memory 950. The processor 910, the UI 930, the memory 950 may communicate with each other through a communication bus 905.

The processor 910 may determine a target solution for a target factory from a platform on which solutions including at least one template for a smart factory are registered. The processor 910 may modify at least one target template of the target solution according to an environment of the target factory. The processor 910 may apply, to the target factory, a target solution to which the modified target template is applied. In this case, the target template may correspond to, for example, a function of at least one module among a plurality of modules for the target solution.

The UI 930 may search for and select a solution corresponding to the target factory from among the solutions registered on the platform. The UI 930 may be provided in the form of a GUI, for example. The processor 910 may set the solution selected through the UI 930 as the target solution.

In addition, the UI 930 may search for and select the target solution corresponding to the target factory for each entire package or for each module included in an entire package. The processor 910 may provide a description of at least one essential module required for performing the target solution selected through the UI 930.

When the target solution is determined through the UI 930, the processor 910 may extract an additional template corresponding to the essential module along with a template corresponding to at least one module included in the target solution. The processor 910 may modify the target template by reconfiguring (or repackaging) the extracted template and the additional template.

The processor 910 may modify the target template for each entire package or for each module. For example, the processor 910 may modify the target template according to the environment of the target factory by a library that is provided through the platform and developed to enable parameter modification.

The memory 950 may store therein the solutions including the at least one template for the smart factory. The memory 950 may also store therein the at least one target template modified by the processor 910 and/or the target solution applied to the target factory. The memory 950 may store therein the library provided through the platform and developed to enable parameter modification.

Further, the processor 910 may perform at least one of the methods described above with reference to FIGS. 1 through 8 or an algorithm corresponding to the method. The processor 910 may be a hardware-implemented data processing device having a physically structured circuit for executing desired operations. The desired operations may include, for example, codes or instructions included in a program. The hardware-implemented data processing device may include, for example, a microprocessor, a central processing unit (CPU), a processor core, a multi-core processor, a multiprocessor, an application-specific integrated circuit (ASIC), and a field-programmable gate array (FPGA).

The processor 910 may execute the program and control the solution provision system 900. The code of the program executed by the processor 910 may be stored in the memory 950.

The memory 950 may store various sets of information generated in a processing process of the processor 910 described above. In addition, the memory 950 may store various sets of data and programs. The memory 950 may include a volatile memory or a non-volatile memory. The memory 950 may include a large-capacity storage medium such as a hard disk to store various sets of data.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher-level code that may be executed by the computer using an interpreter. The above-described devices may be configured to act as one or more software modules in order to perform the operations of the above-described example embodiments, or vice versa.

The software may include a computer program, a piece of code, an instruction, or some combination thereof, to independently or collectively instruct or configure the processing device to operate as desired. The software and data may be embodied permanently or temporarily in any type of machine, component, physical or virtual equipment, computer storage medium or device, or in a propagated signal wave capable of providing instructions or data to or being interpreted by the processing device. The software may also be distributed over network-coupled computer systems so that the software is stored and executed in a distributed manner. The software and data may be stored in one or more non-transitory computer-readable recording media.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

The invention claimed is:

1. A solution provision method, comprising:
providing, on a web-based application platform on which solutions comprising at least one template for a smart factory are registered;
generating, via a client device, a user interface (UI) including a user selectable option allowing the user to search and select from among the registered solutions, a target solution corresponding to a target factory by a solution package or by modules comprised in the solution package;
receiving the user selectable option a selection of a module through the UI;
automatically selecting at least one essential module that is to be executed before or after the module via the user selectable option to execute the module selected through the UI;
module selected through the UI to execute the module selected through the UI;
determining, as the target solution, a solution comprising the selected module and the essential module;
extracting an additional template corresponding to the essential module along with a template corresponding to the selected module comprised in the target solution;
modifying at least one target template corresponding to the target solution by repackaging the template and the additional template according to an environment of the target factory by a library developed to allow parameters provided through the platform to be modifiable;
applying, to the target factory, the target solution to which the at least one modified target template is applied; and
modifying the platform to
include the at least one modified target template as another of the at least one template in the registered solutions, and
update the UI for searching and selecting, from among the registered solutions, the target solution,
wherein the solutions are ones on which, as being determined to be eligible for verification based on a preliminary checklist;
applying using a software evaluation, a technical verification is performed based on an industry-specific reference model and a verification on an industry-specific process is performed to determine whether they are suitable for a specific industry, wherein the technical verification assigns a verification mark to the solution for which the technical verification in operation and the verification on the industry specific processing process in operation have been completed; and wherein the modifying the platform to include the at least one modified target template comprises updating the UI.

2. The solution provision method of claim 1, wherein each template comprises:
  information and functions based on an industry-specific reference model.

3. The solution provision method of claim 1, further comprising:
  providing a description of the at least one essential module required for executing the target solution selected through the UI.

4. The solution provision method of claim 1, wherein the at least one target template corresponds to a function of at least one module among a plurality of modules for the target solution.

5. The solution provision method of claim 1, wherein the modifying the at least one target template comprises:
  modifying at least one target template for each solution package or for each module.

6. The solution provision method of claim 1, further comprising:
  verifying the solution based on the industry-specific reference model; and
  registering the verified solution on the platform.

7. The solution provision method of claim 1, further comprising:
  extracting the target solution applied to the target factory; and
  updating the platform by the extracted target solution.

8. The solution provision method of claim 1, further comprising:
  providing the library for at least one template comprising requirements according to solution characteristics of the smart factory.

9. A non-transitory computer-readable storage medium storing instructions that, when executed by a processor, cause the processor to:
  provide, on a web-based application platform on which solutions comprising at least one template for a smart factory are registered;
  generate, via a client device, a user interface (UI) including a user selectable option allowing the user to search and select, from among the registered solutions, a target solution corresponding to a target factory by a solution package or by modules comprised in the solution package;
  receive the user selectable option a selection of a module through the UI;
  automatically select at least one essential module that is to be executed before or after the module via the user selectable option to execute the module selected through the UI;
  determine, as the target solution, a solution comprising the selected module and the essential module;
  extract an additional template corresponding to the essential module along with a template corresponding to the selected module comprised in the target solution;
  modify at least one target template corresponding to the target solution by repackaging the template and the additional template according to an environment of the target factory by a library developed to allow parameters provided through the platform to be modifiable;
  apply, to the target factory, the target solution to which the at least one modified target template is applied; and
  modify the platform to
    include the modified target template as another of the at least one template in the
  registered solutions, and
    update the UI for searching and selecting, from among the registered solutions, the target solution,
  wherein the solutions are ones on which, as being determined to be eligible for verification based on a preliminary checklist, and
  apply using a software evaluation, a technical verification is performed based on an industry-specific reference model and a verification on an industry-specific process is performed to determine whether they are suitable for a specific industry, wherein the technical verification assigns a verification mark to the solution for which the technical verification in operation and the verification on the industry specific processing process in operation have been completed.

10. A solution provision system, comprising:
  a processor configured to
  provide, on a web-based application platform on which solutions comprising at least one template for a smart factory are registered,
  generate, via a client device, a user interface (UI) including a user selectable option allowing the user to search and select, from among the registered solutions, a target solution corresponding to a target factory by a solution package or by modules comprised in the solution package,
  receive the user selectable option a selection of a module through the UI,
  automatically select at least one essential module that is to be executed before or after the module via the user selectable option to execute the module selected through the UI,
  determine, as the target solution, a solution comprising the selected module and the essential module,
  extract an additional template corresponding to the essential module along with a template corresponding to the selected module comprised in the target solution,
  modify at least one target template of the target solution by repackaging the template and the additional template according to an environment of the target factory by a library developed to allow parameters provided through the platform to be modifiable,
  apply, to the target factory, a target solution to which the at least one modified target template is applied, and
  modify the platform to
    include the at least one modified target template as another of the at least one template in the registered solutions, and
    update the UI for searching and selecting, from among the registered solutions,
  the target solution,
  wherein the solutions are ones on which, as being determined to be eligible for verification based on a preliminary checklist, and
  apply using a software evaluation, a technical verification is performed based on an industry-specific reference model and a verification on an industry-specific process is performed to determine whether they are suitable for a specific industry, wherein the technical verification assigns a verification mark to the solution for which the technical verification in operation and the verification on the industry specific processing process in operation have been completed.

11. The solution provision system of claim 10, wherein the processor is configured to:
provide a description of the at least one essential module required for executing the target solution selected through the UI.

12. The solution provision system of claim 10, wherein the at least one target template corresponds to a function of at least one module among a plurality of modules for the target solution.

13. The solution provision system of claim 10, wherein the processor is configured to:
modify at least one target template for each solution package or for each module.

* * * * *